United States Patent
Shinoda et al.

(10) Patent No.: US 8,356,638 B2
(45) Date of Patent: Jan. 22, 2013

(54) MULTI-LAYER HOSE

(75) Inventors: Atsuhiro Shinoda, Isehara (JP); Hiroshi Kumagai, Yamato (JP)

(73) Assignee: Nissan Motor Co., Ltd., Kanagawa (JP)

( * ) Notice: Subject to any disclaimer, the term of this patent is extended or adjusted under 35 U.S.C. 154(b) by 267 days.

(21) Appl. No.: 12/146,274

(22) Filed: Jun. 25, 2008

(65) Prior Publication Data

US 2009/0000685 A1 Jan. 1, 2009

(30) Foreign Application Priority Data

Jun. 28, 2007 (JP) ................. 2007-169951

(51) Int. Cl.
*F16L 11/00* (2006.01)

(52) U.S. Cl. ................. 138/137; 138/141; 428/36.91

(58) Field of Classification Search ............. 138/137, 138/141; 428/36.91
See application file for complete search history.

(56) References Cited

U.S. PATENT DOCUMENTS

| | | | | |
|---|---|---|---|---|
| 4,748,223 A * | 5/1988 | Haruyoshi et al. | ............ | 526/206 |
| 4,830,920 A * | 5/1989 | Hayashi et al. | ............ | 428/421 |
| 5,010,137 A * | 4/1991 | Umeda et al. | ............ | 525/104 |
| 5,643,997 A * | 7/1997 | Matsuoka et al. | ............ | 525/71 |
| 5,798,158 A * | 8/1998 | Koike et al. | ............ | 428/36.9 |
| 5,855,976 A * | 1/1999 | Oyama et al. | ............ | 428/36.6 |
| 5,937,911 A | 8/1999 | Kodama et al. | | |
| 6,037,062 A * | 3/2000 | Tsutsumi et al. | ............ | 428/476.3 |
| 6,805,168 B2 * | 10/2004 | Van Hooren | ............ | 138/137 |
| RE40,516 E * | 9/2008 | Parsonage et al. | ............ | 428/36.91 |
| 7,488,521 B2 * | 2/2009 | Morohoshi et al. | ............ | 428/36.91 |
| 2002/0036020 A1 * | 3/2002 | Noone et al. | ............ | 138/137 |
| 2002/0174906 A1 * | 11/2002 | Katayama et al. | ............ | 138/109 |
| 2003/0049401 A1 * | 3/2003 | Duke et al. | ............ | 428/36.91 |
| 2003/0099799 A1 * | 5/2003 | Koike et al. | ............ | 428/36.91 |
| 2003/0118765 A1 * | 6/2003 | Govaerts et al. | ............ | 428/36.91 |
| 2003/0150503 A1 * | 8/2003 | Ito et al. | ............ | 138/137 |
| 2003/0221735 A1 * | 12/2003 | Kumagai et al. | ............ | 138/109 |
| 2004/0040608 A1 | 3/2004 | Ito et al. | | |
| 2004/0142135 A1 * | 7/2004 | Verschuere et al. | ............ | 428/36.91 |
| 2004/0146679 A1 * | 7/2004 | Suzuki et al. | ............ | 428/36.91 |
| 2004/0187948 A1 * | 9/2004 | Shifman | ............ | 138/125 |
| 2004/0197510 A1 * | 10/2004 | Shifman | ............ | 428/36.91 |
| 2005/0048240 A1 * | 3/2005 | Hayashi et al. | ............ | 428/36.92 |
| 2005/0263937 A1 * | 12/2005 | Baba et al. | ............ | 264/171.12 |
| 2006/0099368 A1 * | 5/2006 | Park | ............ | 428/36.91 |

(Continued)

FOREIGN PATENT DOCUMENTS

EP 0 637 509 A1 2/1995

(Continued)

OTHER PUBLICATIONS

Japanese Industrial Standard, JIS K 2202, "Motor gasoline," 1999, pp. 1-5.

(Continued)

*Primary Examiner* — James Hook
(74) *Attorney, Agent, or Firm* — Foley & Lardner LLP

(57) ABSTRACT

A multi-layer hose usable for a fuel hose of an automotive vehicle. The multi-layer hose includes an intermediate layer formed of a resin whose main component includes polyester. An outer layer is provided formed of rubber and disposed outside the intermediate layer. Additionally, an inner layer is provided formed of fluoroelastomer and disposed inside the intermediate layer to be laminated directly on the intermediate layer.

3 Claims, 1 Drawing Sheet

U.S. PATENT DOCUMENTS

2006/0134360 A1* 6/2006 Inoue et al. ............... 428/36.91
2007/0048476 A1* 3/2007 Park ........................... 428/36.91
2007/0197702 A1* 8/2007 Nasreddine et al. .......... 524/261

FOREIGN PATENT DOCUMENTS

| | | |
|---|---|---|
| EP | 1 500 859 A1 | 1/2005 |
| JP | 2004-506548 A | 3/2004 |
| WO | WO 02/16112 A1 | 2/2002 |

OTHER PUBLICATIONS

Japanese Industrial Standard, JIS K 6256, "Adhesion testing methods for rubber, vulcanized or thermoplastic," revised Aug. 20, 1999, pp. 1-21.

* cited by examiner 1A   1B   1C 2A   2 B   2 C   2 D

.# MULTI-LAYER HOSE

BACKGROUND OF THE INVENTION

This invention relates to improvements in a multi-layer hose preferably usable for a fuel hose of an automotive vehicle, and more particularly to a multi-layer hose having a strong adhesiveness between layers while having an excellent fuel permeation resistance against fuel such as an alcohol-containing fuel.

Mainly in the United States, the emission control for hydrocarbon-based evaporative emissions from automotive vehicle fuel systems has been strictly tightened, and therefore rubber hoses for fuel having various structures have been developed to meet the control. Particularly in order to achieve a sealability, a fuel permeation resistance and a flexibility which are required in a connecting pipe, a rubber hose commonly proposed has a structure where rubber materials serving as inner and outer layers are laminated on a fuel-barrier resinous material serving as intermediate layer.

As proposed in Japanese Unexamined application publication No. 2004-506548, multi-layer hoses which have been widely employed are provided by disposing fluoroelastomer (FKM) or acrylonitrile butadiene (NBR) as an inner layer, ternary copolymer fluorothermoplastic THV (tetrafluoroethylene-hexafluoropropylene-vinylidene fluoridate) as an intermediate layer (a fuel-barrier layer), and epichlorohydrin rubber (ECO) and acrylonitrile butadiene (NBR) as an outer layer. Additionally, it is commonly known that such multi-layer hoses can include further layers formed of chlorosulfonated polyethylene (CSM), chlorinated polyethylene (CPE) or the like on the outer layer.

SUMMARY OF THE INVENTION

However, drawbacks have been encountered in the above conventional techniques. More specifically, in such multi-layer hoses as to include fluorothermoplastic as the fuel-barrier layer, the thickness of the fuel-barrier layer tends to be increased in order to secure a fuel barrier performance against an ethanol-containing gasoline which becomes widespread. As the thickness of the fuel-barrier layer is increased in order to improve the fuel barrier performance, the hose is therefore decreased in flexibility and formability.

In other words, the multi-layer hose is required to accomplish both formability and fuel barrier performance with increasing the fuel-barrier layer in thickness.

Further, designs for materials are arranged because of the fuel-barrier layer formed of fluorothermoplastic, for example, by disposing an adhesive layer in order to secure an adhesiveness to the inner and outer rubber layers, by carrying out a treatment with a primer, or by adding an adhesiveness-providing agent to the inner layer rubber. However, this raises a fear that an unreacted adhesive component is extracted into fuel thereby adversely affecting peripheral parts.

In view of the above, an object of the present invention is to provide an improved multi-layer hose which can effectively overcome drawbacks encountered in conventional multi-layer hose.

Another object of the present invention is to provide a multi-layer hose being superior in fuel barrier performance to those produced by conventional fuel-barrier techniques, and being excellent in fuel barrier performance against the alcohol-containing fuel while having a strong adhesiveness among the intermediate layer and the inner and outer layers.

An aspect of the present invention resides in a multi-layer hose comprising: an intermediate layer formed of a resin whose main component includes polyester; an outer layer formed of rubber and disposed outside the intermediate layer; and inner layer formed of fluoroelastomer and disposed inside the intermediate layer to be laminated directly on the intermediate layer.

DETAILED DESCRIPTION OF THE INVENTION

Figure 1:
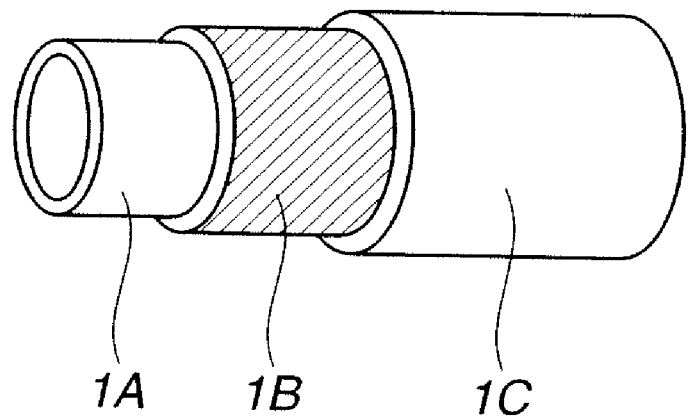
FIG. 1 is a fragmentary perspective view of an embodiment of a multi-layer hose according to the present invention, the multi-layer hose being formed to have a three-layer structure as will be discussed as Examples of the present invention, in which each layer is more largely cut out than an immediately inner one for the purpose of clearly showing the three-layer structure of the multi-layer hose.

Hereinafter, an embodiment of a multi-layer hose according to the present invention will be discussed in detail.

According to the present invention, a multi-layer hose includes an intermediate layer (or an fuel-barrier layer) formed with an axial hollow through which fuel is flowable, the intermediate layer being formed of a resin whose main component is polyester which is excellent in barrier performance against an alcohol-containing fuel and in adhesiveness to rubbers. The multi-layer hose further includes an outer layer formed of rubber and disposed outside the intermediate layer in a diametrical direction of the intermediate layer to be coaxial with the intermediate layer. Furthermore, the multi-layer hose includes an inner layer formed of fluoroelastomer and disposed inside the intermediate layer in the diametrical direction of the intermediate layer to be coaxial with the intermediate layer. The intermediate layer in the present invention is allowed to have a thickness equal to or smaller than that of a conventional fuel-barrier layer on which fluorothermoplastic is used in conventional hoses, thereby resolving issues of a flexibility and a workability.

In the multi-layer hose provided according to the present invention, the resin forming the intermediate layer contains polyester as its main component. In this specification "the main component" refers to a content of not lower than 70%.

Examples of the resin forming the intermediate layer are polybutylene naphthalate (referred hereinafter to as "PBN") and a copolymer thereof, polybutylene terephthalate (referred hereinafter to as "PBT") and a copolymer thereof, and any combinations of these.

The inner layer of the multi-layer hose provided according to the present invention is formed of fluoroelastomer such as vinylidene fluoride-hexafluoropropylene binary copolymer fluoroelastomer, vinylidene fluoride-hexafluoropropylene-tetrafluoroethylene ternary copolymer fluoroelastomer and tetrafluoroethylene-propylene-vinylidene fluoride ternary copolymer fluoroelastomer. It is preferable not to dispose any layer of other composition than that of the intermediate layer between the intermediate layer and the inner elastomer layer.

More specifically, the polyester resin serving as the intermediate layer and the fluoroelastomer serving as the inner layer are directly laminated (or laminated to be in contact with each other) and then vulcanized, with which a strong adhesiveness between the layers and an excellent fuel-barrier performance against the alcohol-containing fuel are ensured.

The strong adhesiveness can be thus ensured, so that it is required neither to add an adhesive component to the inner elastomer layer nor to apply an adhesive to the surface of the resinous layers. With this, the multi-layer hose provided according to the present invention is excellent in fuel-barrier performance and in workability, and has a strong adhesiveness between the layers and a low extraction of the adhesive component into fuel.

The outer rubber layer disposed generally coaxial with and around the intermediate layer may be formed of a rubber material selected from the group consisting of epichlorohydrin rubber (ECO), acrylonitrile butadiene (NBR), polyacrylic rubber (ACM), ethylene acrylic rubber (AEM), chlorosulfonated polyethylene (CSM), chlorinated polyethylene (CPE), chloroprene rubber (CR), ethylene propylene rubber (EPM) and ethylene propylene diene rubber (EPDM).

The multi-layer hose according to the present invention is based on the ones having a three-layer structure including the intermediate layer and the outer and inner layers disposed outside and inside the intermediate layer, respectively; however, it will be understood that the number of layers is not limited to these as far as the multi-layer hose includes the intermediate layer formed of the resin whose main component is polyester and the inner layer formed of a rubber material and laminated directly on an inner surface of the intermediate layer. In other words, the multi-layer hose may be arranged according to various kinds of performances required, such that the intermediate layer or the outer layer has a multi-layer structure. Possibly an intervening layer may be disposed between the intermediate layer and the outer layer, or the outer layer may be coated with a coat layer at the outer periphery of the outer layer.

The multi-layer hose according to the present invention is provided by directly laminating the intermediate layer and the inner elastomer layer without addition of the adhesive component and without application of the adhesive, thereby obtaining an excellent performance against extraction of the adhesive component or the like (i.e., an adhesive component-extraction). The adhesive component-extraction is examined as follows. The hose is charged with a solution prepared by mixing isooctane, toluene and ethanol at a volume ratio of 45:45:10, and then sealed and set aside at 40° C. for 168 hours (i.e., for 1 week). Thereafter, the sealed solution is retrieved from the hose and an extract contained therein is weighed. It is preferable that the extract has a hexane-insoluble content (a content insoluble in hexane) of not larger than 0.1 mg/cm$^2$.

The multi-layer hose according to the present invention is obtained by preparing a multi-layer tubular hose formed through, for example, a tandem extrusion process (a multi-layer extrusion for rubber or resinous layers) or a process of wrapping a polyester resin serving as the intermediate layer around the inner elastomer layer, and then by vulcanizing the tubular hose.

The multi-layer hose according to the present invention includes the intermediate layer formed of the resin whose main component is polyester and the outer and inner elastomer layers respectively disposed outside and inside the intermediate layer, and it is preferably used as a fuel hose particularly for an automotive vehicle powered by the alcohol-containing fuel. Such a laminated structure as to be provided by laminating rubber materials on both sides of polyester resin can be widely applied to those other than the hoses, for example, to vessels for various kinds of liquids such as alcohols, to feed pipes or to storage tanks. Fuels are exemplified by gasoline, diesel fuel, alcohol, LP gas, natural gas, hydrogen fuel and any combinations of these; however, the examples are not particularly limited to these.

EXAMPLES

The present invention will be more readily understood with reference to the following Examples and Comparative Examples; however, these Examples are intended to illustrate the invention and are not to be construed to limit the scope of the invention.

Example 1

A multi-layer hose having a three-layer structure as shown in FIG. 1 was produced as follows. The three-layer structure included an inner layer denoted by the reference numeral 1A in FIG. 1 and formed of vinylidene fluoride-hexafluoropropylene-tetrafluoroethylene ternary copolymer fluororubber on which a peroxide was used as a vulcanizing agent. An intermediate layer denoted by the reference numeral 1B was formed of PBN (available from Teijin Chemicals Ltd. under the trade name of TQB-OT). An outer layer denoted by the reference numeral 1C was formed of epichlorohydrin rubber (ECO) on which thiourea was used as a vulcanizing agent. In the production process, inner layer 1A, intermediate layer 1B and outer layer 1C were extruded to form a tubular hose. Then, vulcanization (included a primary one made at 150° C. for 30 minutes and a secondary one made after the primary one at 160° C. for 90 minutes) was conducted on the tubular hose, thereby obtaining the multi-layer hose having the three-layer structure of Example 1.

Inner layer 1A, intermediate layer 1B and outer layer 1C respectively had layer thickness of 0.5 mm, 0.1 mm and 3.4 mm. Further, the multi-layer hose had an outer diameter of 32.4 mm, an inner diameter of 24.4 mm, and a length (in an axial direction) of 300 mm.

Example 2

A procedure of Example 1 was repeated with the exception that inner layer 1A was formed of vinylidene fluoride-hexafluoropropylene binary copolymer fluoroelastomer on which a peroxide was used as a vulcanizing agent and that intermediate layer 1B was formed of PBT (available from Polyplastics Co., Ltd. under the trade name of 700FP), thereby obtaining the multi-layer hose having the three-layer structure of Example 2.

Example 3

A procedure of Example 1 was repeated with the exception that inner layer 1A was formed of vinylidene fluoride-hexafluoropropylene binary copolymer fluoroelastomer on which a peroxide was used as a vulcanizing agent, thereby obtaining the multi-layer hose having the three-layer structure of Example 3.

Example 4

A procedure of Example 1 was repeated with the exception that polyol was used as a vulcanizing agent on inner layer 1A formed of vinylidene fluoride-hexafluoropropylene-tetrafluoroethylene ternary copolymer fluoroelastomer, thereby obtaining the multi-layer hose having the three-layer structure of Example 4.

Example 5

A procedure of Example 1 was repeated with the exception that inner layer 1A was formed of tetrafluoroethylene-propylene-vinylidene fluoride ternary copolymer fluoroelastomer on which polyol was used as a vulcanizing agent, thereby obtaining the multi-layer hose having the three-layer structure of Example 5.

Comparative Example 1

A procedure of Example 1 was repeated with the exception that inner layer 1A was formed of vinylidene fluoride-hexafluoropropylene-tetrafluoroethylene ternary copolymer fluoroelastomer to which 1,8-diazabicyclo[5.4.0]undec-7-ene was added and that intermediate layer 1B was formed of ternary copolymer fluorothermoplastic THV (tetrafluoroethylene-hexafluoropropylene-vinylidene fluoridate), thereby obtaining the multi-layer hose having the three-layer structure of Comparative Example 1.

Comparative Example 2

Figure 2:
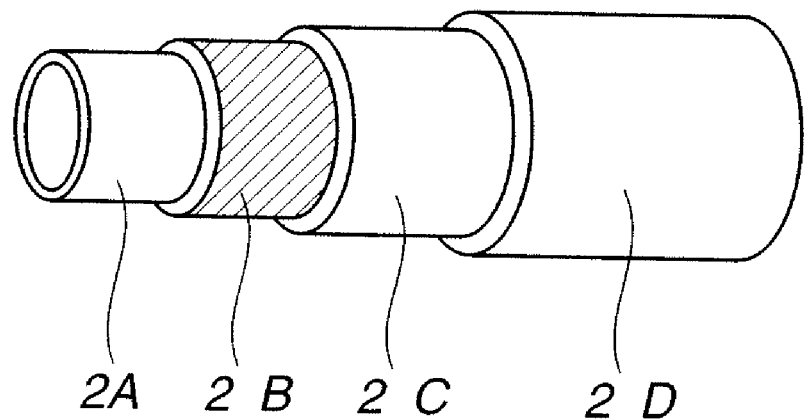
FIG. 2 is a fragmentary perspective view of an embodiment of a multi-layer hose according to the present invention, the multi-layer hose being formed to have a four-layer structure as will be discussed as Examples of the present invention, in which each layer is more largely cut out than an immediately inner one for the purpose of clearly showing the four-layer structure of the multi-layer hose.

A multi-layer hose having a four-layer structure as shown in FIG. 2 was produced. The four-layer structure included an inner layer denoted by the reference numeral 2A in FIG. 2 and formed of NBR to which 1,5-diazabicyclo[4.3.0]non-5-ene was added. Sulfur was used as a vulcanizing agent on inner layer 2A. An intermediate layer denoted by the reference numeral 2B was formed of ternary copolymer fluorothermoplastic THV (tetrafluoroethylene-hexafluoropropylene-vinylidene fluoridate). An outer layer denoted by the reference numeral 2D was formed of chlorosulfonated polyethylene (CSM). Additionally, an intervening layer denoted by the reference numeral 2C and formed of the same material as that forming inner layer 2A (more specifically, the material formed of NBR to which 1,5-diazabicyclo[4.3.0]non-5-ene was added) was disposed to intervene between outer layer 2D and intermediate layer 2B, thereby obtaining the multi-layer hose having the four-layer structure of Comparative Example 2.

Inner layer 2A, intermediate layer 2B, intervening layer 2C and outer layer 2D respectively had layer thickness of 1.5 mm, 0.1 mm, 1.9 mm and 0.5 mm. Further, the multi-layer hose had an outer diameter of 32.4 mm, an inner diameter of 24.4 mm, and a length (in an axial direction) of 300 mm.

[Evaluation of Performance]

Each of the multi-layer hoses obtained in Examples and Comparative Examples had a fuel permeation test, an adhesiveness test and an adhesive component-extraction test (for examining an amount of the adhesive component extracted into fuel) in the following manner, with which performance thereof was evaluated. Results of the evaluation are shown in Table 1.

[Fuel Permeability]

A vessel for the test, formed of stainless steel, was charged with a fuel prepared by mixing 10 vol. % of ethanol and 90 vol. % of regular gasoline available in the market and corresponding to item 2 of JIS (Japanese Industrial Standard) K 2202. Each of the multi-layer hoses obtained in Examples and Comparative Examples, serving as a specimen, was fastened at one end to the vessel with a cramp and fitted at the other end with a stopper formed of stainless steel by using another cramp. While keeping this state, the specimen was set aside in the atmosphere at 40° C. for 20 weeks, followed by measuring an amount of permeation of fuel by using SHED (Sealed Housing For Evaporative Determination) under conditions specified by CARB (California Air Resources Board within the California Environment Protection Agency).

Evaluations of the fuel permeability are shown in Table 1 by "A", "B" and "C". More specifically, the evaluation "A" means that an amount of fuel permeation the specimen had was less than $1/10$ of that the multi-layer hose of Comparative Example 1 had. The evaluation "B" means that an amount of fuel permeation the specimen had was less than $1/5$ of that the multi-layer hose of Comparative Example 1 had. The evaluation "C" means that an amount of fuel permeation the specimen had was equivalent to that the multi-layer hose of Comparative Example 1 had.

[Adhesiveness]

Each of the multi-layer hoses obtained in Examples and Comparative Examples was charged with a fuel prepared by mixing 10 vol. % of ethanol and 90 vol. % of regular gasoline available in the market and corresponding to item 2 of JIS K 2202, and then sealed and set aside at 60° C. for 168 hours. Upon retrieving the sealed fuel, the hose was further set aside in a room for 10 minutes and then punched to obtain a specimen having a width of 10 mm, a length of 200 mm and an original thickness.

The inner elastomer layer (or the inner layer) was slightly peeled from the intermediate layer at any portion of the thus obtained specimen, and thereafter the specimen was attached to a test machine at grips of the test machine, followed by operating the test machine under the conditions in accordance with JIS K 6256. Then, tensile loads were plotted on a graph, thereby obtaining a tensile load curve having waves with which a peel load (i.e., an average value of the waves) was determined. A peel strength was obtained by the following equation:

Peel strength (N/cm)=peel load (N)/width of the specimen (cm)

Evaluations of the adhesiveness are shown in Table 1 by "A" and "B". More specifically, the evaluation "A" means that the specimen had a better peel strength than that of the multi-layer hose of Comparative Example 1. The evaluation "B" means that the specimen was equivalent to the multi-layer hose of Comparative Example 1 in peel strength.

[Extraction Property of Adhesive Component into Fuel]

Each of the multi-layer hoses obtained in Examples and Comparative Examples was charged with a fuel prepared by mixing 45 vol. % of isooctane, 45 vol. % of toluene and 10 vol. % of ethanol, and then sealed. The sealed fuel was retrieved from the hose after being set aside at 40° C. for 168 hours thereby obtaining an extract solution. The extract solution was dried in air to be concentrated, thereby obtaining a concentrated solution. Then, hexane was added to the concentrated solution and stirred for at least 1 hour in an ultrasonic cleaner.

After the concentrated solution was allowed to stand still for 24 hours, a supernatant was removed therefrom. A precipitate thus obtained was subjected to a vacuum drying at 40° C. for 8 hours to obtain an insoluble content. The insoluble content was then weighed as a hexane-insoluble content, upon which a weight of the hexane-insoluble content per unit area of an inner surface of the multi-layer hose was determined.

[Total Evaluation]

A total evaluation of each of the multi-layer hoses obtained in Examples and Comparative Examples is shown in Table 1 by "A" or "B". The evaluation "A" is better than the evaluation "B".

TABLE 1

| Examples | Structure of hose | | | | Performance of hose | | | |
|---|---|---|---|---|---|---|---|---|
| | Inner layer | Intermediate layer | Intervening layer | Outer layer | Fuel permeability | Adhesiveness | Hexane-insoluble content (mg/cm$^2$) | Total Evaluation |
| Example 1 | Ternary copolymer fluoroelastomer A | PBN | — | ECO | A | A | 0.019 | A |
| Example 2 | Binary copolymer fluoroelastomer | PBT | — | ECO | B | A | 0.029 | A |
| Example 3 | Binary copolymer fluoroelastomer | PBN | — | ECO | A | A | 0.026 | A |
| Example 4 | Ternary copolymer fluoroelastomer A (vulcanized with polyol) | PBN | — | ECO | A | A | 0.019 | A |
| Example 5 | Ternary copolymer fluoroelastomer B | PBN | — | ECO | A | A | 0.019 | A |
| Comparative Example 1 | Ternary copolymer fluoroelastomer A | THV | — | ECO | C | B | 1.0 | B |
| Comparative Example 2 | NBR | THV | NBR | CSM | C | A | 4.2 | B |

Ternary copolymer fluoroelastomer A: vinylidene fluoride-hexafluoropropylene-tetrafluoroethylene ternary copolymer fluoroelastomer
Ternary copolymer fluoroelastomer B: tetrafluoroethylene-propylene-vinylidene fluoride ternary copolymer fluoroelastomer As apparent from Table 1, it is confirmed that any of the multi-layer hoses of Examples 1 to 5 is superior to those of Comparative Examples 1 and 2 in performance.

In other words, the multi-layer hoses of Examples 1 to 5 are confirmed to have a sufficient and excellent adhesiveness between the inner elastomer layer and the intermediate layer (or the fuel-barrier layer). Further, the multi-layer hoses of Examples 1 to 5 exhibit a low amount of the adhesive component-extraction since they contain no adhesive component, which means that they have a high property against the adhesive component-extraction. Furthermore, regarding the fuel permeability, it is confirmed that the multi-layer hoses of Examples 1 to 5 to which polyester resin was used for the intermediate layer have an excellently low fuel permeability against an ethanol-containing fuel, as compared with Comparative Examples using fluorothermoplastic.

According to the present invention, the resin whose main component is polyester such as polybutylene naphthalate and polybutylene terephthalate is provided as the intermediate layer. With this, a multi-layer hose is allowed to have a strong adhesiveness between the inner and outer rubber layers and an excellent fuel permeation resistance against the alcohol-containing fuel.

The entire contents of Japanese Patent Application P2007-169951 (filed Jun. 28, 2007) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:
1. A multi-layer hose comprising:
an intermediate layer consisting of consisting of polybutylene naphthalate;
an outer layer comprising epichlorohydrin rubber (ECO) and disposed outside the intermediate layer; and
an inner layer consisting of at least one of vinylidene fluoride-hexafluoropropylene binary copolymer fluororubber, vinylidene fluoride-hexafluoropropylene-tetrafluoroethylene ternary copolymer fluororubber, and tetrafluoroethylene-propylene-vinylidene fluoride ternary copolymer fluororubber, the inner layer being disposed inside the intermediate layer,
wherein the intermediate layer and the inner layer are directly laminated to be in contact with each other,
wherein the inner layer and intermediate layer are adhered to each other using a primary vulcanization and a secondary vulcanization, and
wherein the hose comprises no adhesive between the intermediate layer and the inner layer.
2. A multi-layer hose as claimed in claim 1, wherein the multi-layer hose has a hexane-insoluble content of not larger than 0.1 mg/cm$^2$, the hexane-insoluble content being able to be extracted from the multi-layer hose into a liquid prepared by mixing 45 vol. % of isooctane, 45 vol. % of toluene and 10 vol. % of ethanol and sealed in the multi-layer hose at a certain temperature for a certain period of time.
3. A method of making a multi-layer hose comprising:
forming a multi-layer hose comprising:
an intermediate layer consisting of polybutylene naphthalate;
an outer layer comprising epichlorohydrin rubber (ECO) and disposed outside the intermediate layer; and
an inner layer consisting of at least one of vinylidene fluoride-hexafluoropropylene binary copolymer fluororubber, vinylidene fluoride-hexafluoropropylene-tetrafluoroethylene ternary copolymer fluororubber, and tetrafluoroethylene-propylene-vinylidene fluoride ternary copolymer fluororubber, the inner layer being disposed inside the intermediate layer,
wherein the intermediate layer and the inner layer are directly laminated to be in contact with each other,
wherein the inner layer and intermediate layer are adhered to each other using a primary vulcanization and a secondary vulcanization, and
wherein the hose comprises no adhesive between the intermediate layer and the inner layer.

* * * * *